W. E. NICKERSON.
AUTOMATIC WEIGHING MACHINE.
APPLICATION FILED FEB. 24, 1903.

930,489.

Patented Aug. 10, 1909.
5 SHEETS—SHEET 1.

Fig. 1.

Witnesses:
Arthur F. Randall
Joseph T. Brennan

Inventor:
Wm E. Nickerson,
by E. D. Chadwick,
Atty.

W. E. NICKERSON.
AUTOMATIC WEIGHING MACHINE.
APPLICATION FILED FEB. 24, 1903.

930,489.

Patented Aug. 10, 1909.
5 SHEETS—SHEET 2.

Witnesses:

Inventor:
Wm E. Nickerson,
by E. D. Chadwick, Atty.

W. E. NICKERSON.
AUTOMATIC WEIGHING MACHINE.
APPLICATION FILED FEB. 24, 1903.

930,489.

Patented Aug. 10, 1909.
5 SHEETS—SHEET 5.

Witnesses:
Arthur T. Randall
Joseph T. Brennan

Inventor:
Wm. E. Nickerson,
by E. D. Chadwick, Atty.

UNITED STATES PATENT OFFICE.

WILLIAM E. NICKERSON, OF CAMBRIDGE, MASSACHUSETTS, ASSIGNOR TO AUTOMATIC WEIGHING MACHINE COMPANY, OF NEW YORK, N. Y., A CORPORATION OF NEW YORK.

AUTOMATIC WEIGHING-MACHINE.

No. 930,489.     Specification of Letters Patent.     Patented Aug. 10, 1909.

Application filed February 24, 1903. Serial No. 144,609.

*To all whom it may concern:*

Be it known that I, WILLIAM E. NICKERSON, a citizen of the United States, and resident of Cambridge, in the county of Middlesex and Commonwealth of Massachusetts, have invented new and useful Improvements in Automatic Weighing-Machines, of which the following is a specification.

My invention relates to automatic weighing apparatus of that type in which the parts are operated by power derived from the weight of the material weighed, and is intended more particularly to provide a simple and efficient apparatus which will be specially adapted to the weighing automatically of light, bulky substances such as bran, cotton seed hulls and the like. Considerable difficulty has heretofore been experienced in automatically weighing such substances with rapidity and accuracy, mainly because of their tendency to clog and stick rather than to flow freely, in connection with the fact that large openings have to be provided for the delivery of such material to and from the weighing receptacle if rapid operation is to be secured, which openings it is difficult to close or control with sufficient quickness when the scale beam poises.

My invention provides an apparatus by means of which the above objections are largely overcome, as will hereinafter appear, although it is also well adapted for weighing many other substances.

Briefly described, my apparatus comprises a weighing beam and a scale pan or other weighing receptacle, carried thereby, a cut-off also carried by the scale beam so as to move in unison with the weighing receptacle, and connections between said receptacle and cut-off whereby the dumping of the former operates the latter to prevent the delivery of material to said receptacle until it is ready to receive another load. I am thereby enabled to control the entire action of the apparatus by means of a single latch, as will presently appear, and also to feed the material to the apparatus in a continuous stream and thus to dispense with all variable delivery openings and valves for controlling the same.

My invention also includes certain structural arrangements and details hereinafter described.

An automatic weighing machine embodying the preferred form of my improvements is illustrated in the accompanying drawings, in which.

The working parts of my apparatus are shown in the drawings as supported by vertical standards 2—2, located one at each end of the machine, and connected and braced by suitable tie rods 3. Near the bottom of the frame-work is located a scale beam, which is preferably composed of end pieces 4—4 carried respectively by the adjacent supports 2 and connected at their rear ends by a cross rod 5, which may serve as the weighing weight. This rod 5 is shown as provided with a pin 6 on which small adjusting weights 7 may be detachably carried. On the opposite or front end of each of the beam ends 4 is pivotally mounted an upright 8, said uprights being connected by suitable cross rods 8ª. The frame thus formed is kept vertical and enabled to move freely with the scale beam by means such as links 9—9 pivoted at one end to studs carried by said uprights respectively and at the other end to studs carried by the supports 2. These uprights 8—8 carry the receptacle in which the material is received and weighed, said receptacle being herein represented as a dumping pan 10 of a well-known scoop shape, as such a receptacle is preferable to one having a discharge door or closer when materials of the kind above referred to are to be handled. The pan 10 is pivotally supported at its ends by the uprights 8 or parts connected therewith, such as laterally extending ears 11, and the axis on which said pan turns is so located that when a full load of material has been delivered to the pan, the center of gravity of the upright pan and load will lie to one side of said axis, with the result that the pan will automatically tip and dump said load if permitted so to do.

Above the pan 10 is located a stream-controller or cut-off 12 which is also carried by the uprights 8, being shown as pivotally supported by laterally extending ears 13 secured to said uprights. This cut-off is so constructed and arranged that it will either intercept material delivered to it from above, or permit said material to fall freely into the pan 10, according to the position of said cut-off. By preference said cut-off is what I term an accumulating cut-off, that is to say, when in that position in which it intercepts the material fed to the machine, it also serves as a receptacle for holding and accumulating such material as long as it remains in the position referred to. My preferred form of accumulating cut-off has substantially the shape of a hollow cylinder with closed ends and with a considerable portion of its periphery cut away on one side, so that that portion of the cylinder which is not cut away forms in effect a receptacle with a curved bottom 14 and an open top.

Figure 5:
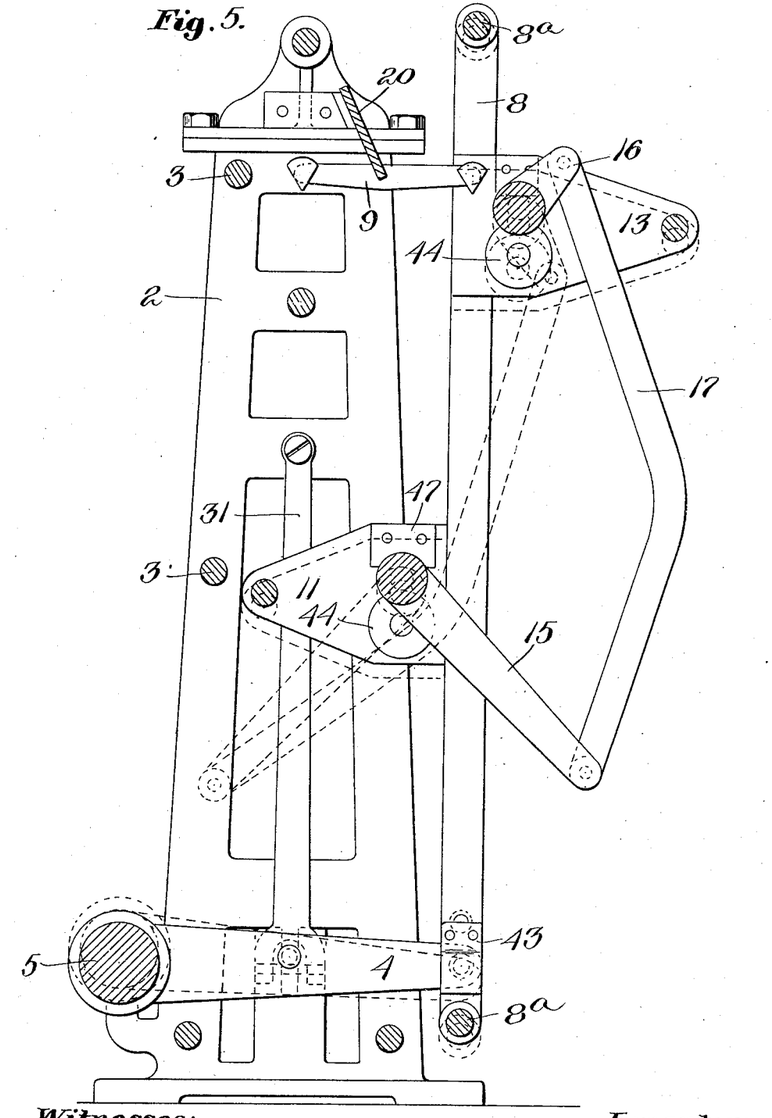

Inasmuch as the cut-off 12 and the pan 10 are both carried by and moved with the scale beam and the uprights 8, said cut-off and pan may be positively connected without interfering with their up-and-down movements, and therefore I am able to provide these parts with simple and positive connections so constructed and arranged that whenever the pan 10 tilts into its load-discharging position, it partially rotates the cut-off 12 and brings it into position to receive and hold the material delivered to the apparatus while the pan is discharging its contents, and when said pan, after so discharging its contents, returns to its load-receiving position, it thereby restores the cut-off to its original position, which is such that the material received and accumulated by the cut-off, while the pan 10 is discharging a load, is dumped into the empty pan as soon as the latter has returned into its load-receiving position. While the cut-off is in this position, the stream of material which is supplied to the apparatus is not intercepted by said cut-off but flows directly into the pan 10. My preferred mechanism for accomplishing the results just described consists of an arm 15 rigidly secured to the axis of the scale pan 10 at one end thereof, an arm 16 rigidly secured to the corresponding end of the axis of the cut-off 12, and a link 17 connecting the free ends of said arms, said link and arms being proportioned and formed substantially as shown in Fig. 5, so that the first portion of the tilting movement of the pan 10, when it is about to discharge a load, gives the cut-off 12 a quick rotation and thus causes it to intercept the stream of material before any substantial part thereof has been added to the load just weighed, while during the latter portion of the discharging movement of the pan the free ends of the arms 15 and 16 are brought substantially into line with each other and with the center on which said pan turns, in which position the tilting movements of the pan have little effect on the cut-off. Conversely, when the pan 10 returns to its load-receiving position, the cut-off remains practically stationary during the first part of the movement of said pan, but when the latter has reached a position in which it will receive and retain material, the cut-off is quickly rotated and removed from the path of the stream of material.

The material to be operated upon may be delivered to the apparatus in any desired manner, the means shown in the drawings being a belt-conveyer composed of an endless belt 18 passing around a roller 19 journaled at the top of the apparatus, and serving to bring material to the apparatus from any convenient point in a well known manner. As this material leaves the belt as the latter passes around the roller 19, it falls into the accumulating cut-off 12 or into the scale pan 10, according to the position of the parts, a fixed deflecting guide 20 being employed, if necessary, for properly directing the falling material.

Figure 1:
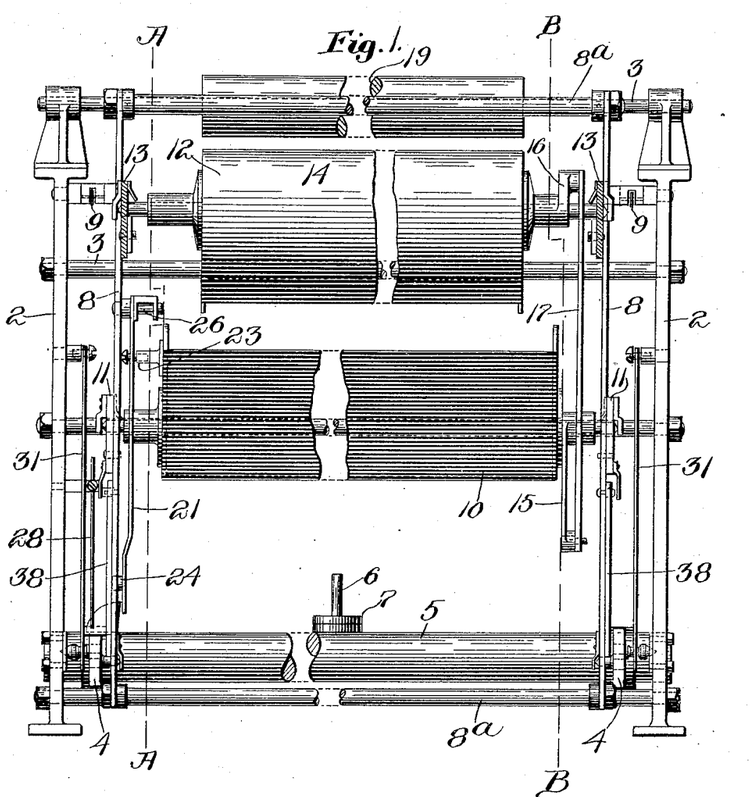
Figure 1 is a front elevation of the complete machine, which is shown as broken between its ends for the purpose of indicating that the machine may have any convenient width.
Figure 4:
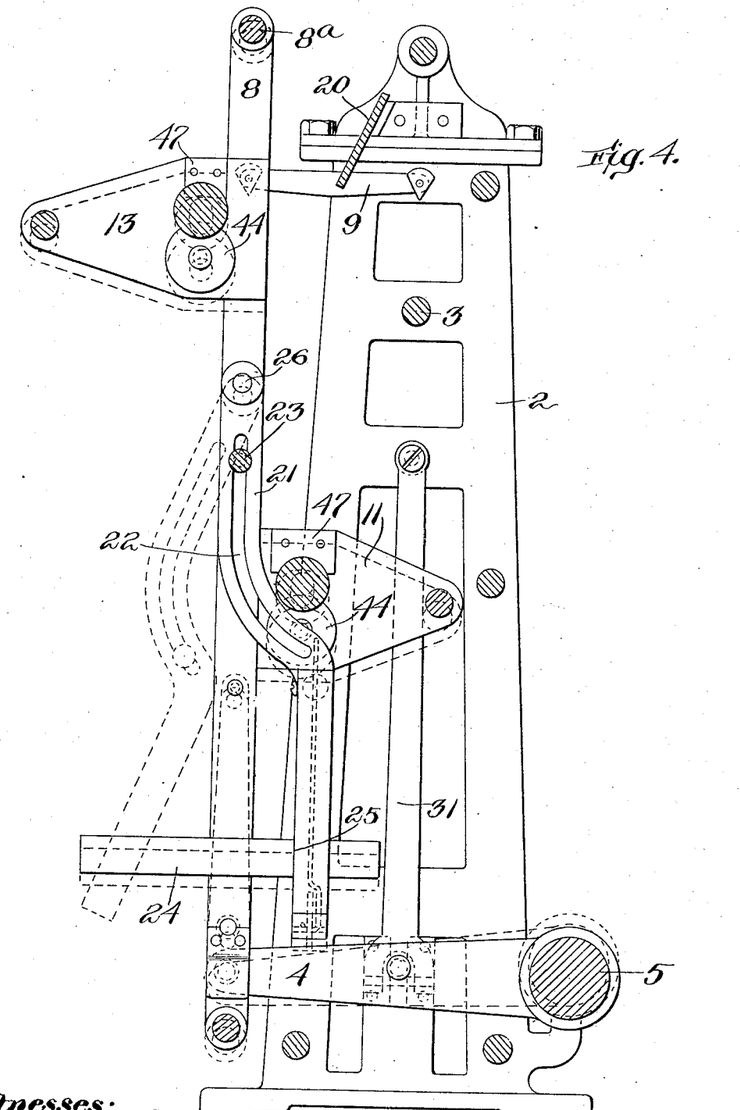
Figs. 4 and 5 are vertical sections taken respectively on the lines A—A and B—B in Fig. 1, and looking in each case toward the adjacent end of the machine.
Figure 7:
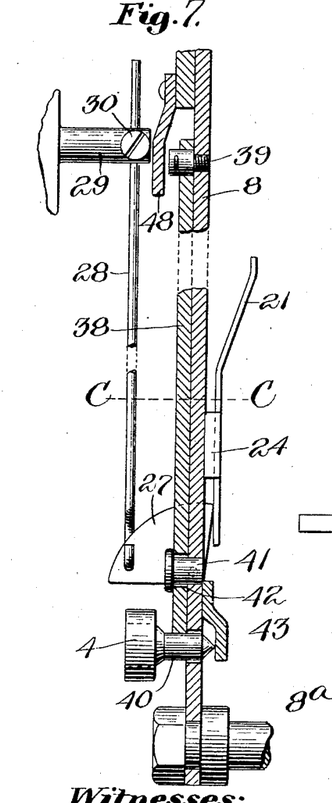
Fig. 7 is a vertical section illustrating a latch hereinafter described, and adjacent parts.
Figure 8:
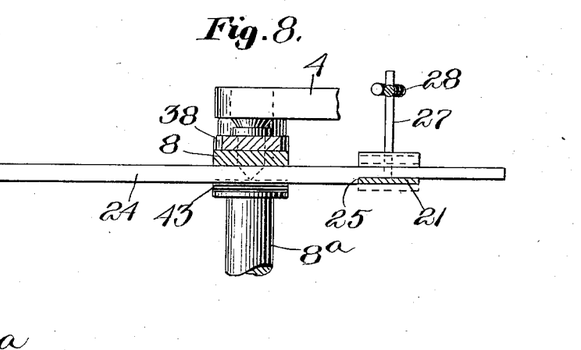
Fig. 8 is a transverse section taken on the line C—C in Fig. 7.
Figures 9, 10:
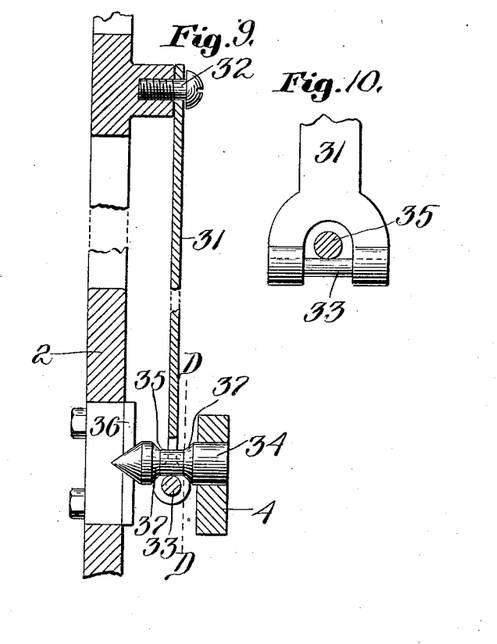
Fig. 9 is a detail vertical section illustrating a form of scale beam suspension hereinafter described.
Fig. 10 is a section on the line D—D in Fig. 9.

Inasmuch as the scale pan and cut-off are positively connected in such manner that they necessarily move in unison, I am able to control the entire operation of the apparatus by means of a single latch mechanism, which is so constructed and arranged that when the scale pan is in the load-receiving position, it is locked by said latch and prevented from tilting until a load has been completed in it, whereupon, by the poising of the scale beam, said latch is instantly operated and the scale pan is released and permitted to discharge its contents. After a load has thus been discharged and the scale pan has returned to the load-receiving position, it is again automatically locked therein by said latch. In order to make the sensitiveness of any apparatus as great as possible, I have devised a novel form of latch for the purpose above described, which offers no appreciable resistance to the poising of the scale beam and is released by a very slight movement thereof. This latch is shown at the left hand end of Fig. 1 and is illustrated in detail in Fig. 7. Referring to these figures and to Fig. 4, 21 represents an arm pivoted at one end to the adjacent upright 8 and provided with a cam slot 22 through which passes a pin 23 rigidly secured to one end of the scale pan 10. The slot 22 is of such shape that when the scale pan is in the load-receiving position, any movement thereof toward the load-discharging position will tend to swing the arm 21 into the position shown in dotted lines in Fig. 4, and hence if said arm be prevented from thus moving, the scale pan will thereby be held in its load-receiving position until said arm is released. That portion of the slot 22 into which the pin 23 moves after the arm 21 has been swung laterally by the tilting of the scale pan may be so shaped, as shown, that it will be concentric with the axis on which the scale pan turns, so that no lateral movement of said arm 21 will occur during the last portions of the movement of the scale pan as it tilts into the load-discharging position. Near the path of the free end of the arm 21 is located a strip 24, which is rigidly secured to the corresponding upright 8 and is provided with a shoulder 25 adapted to engage said free end and act as a stop for the same when the scale pan is in the load-receiving position. The strip 24 is preferably made long enough to act as a lateral guide for the arm 21, as best shown in Fig. 4, and said arm is made sufficiently elastic to cause it to press lightly against said strip 24, so that when moved into the position shown in full lines in Fig. 4, it will automatically spring behind said shoulder 25. As shown in Fig. 1 the arm 21 is preferably pivoted on a long bearing 26, in order to prevent lateral play of said arm. For releasing the free end of the arm 21 from the shoulder 25 and thus permitting the pan 10 to discharge a load, I provide a small triangular plate 27, which is located within a slot cut in the proper upright 8 and is pivoted thereto at one of its lower corners, in such manner that its upper corner is adapted to bear against the free end of the arm 21 when latched, as shown in Fig. 7. To the other corner of said plate is pivotally secured a rod 28, the upper end of which is rigidly secured to the framework of the machine, being preferably made adjustable with respect to the same by being passed through a stud 29 and clamped in any desired position by means of a set screw 30. These parts are so adjusted that when the apparatus is in the load-receiving position, the upper corner of the plate 27 just touches the free end of the arm 21, this being the position shown in Fig. 7. As thus constructed, when a load is completed in the scale pan and the latter descends, the plate 27 moves downward with the upright 8 which carries it, and as one corner of said plate is held against downward movement by the rod 28, the plate necessarily turns on its pivot and by pressing against the free end of the arm 21 disengages the same from the shoulder 25, thus releasing the scale pan and permitting the same to tilt and discharge its load. After such discharge the scale beam immediately rises, carrying the uprights 8 with it and thus restoring the plate 27 to the position shown in Fig. 7, so that when the pan 10 returns to its load-receiving position the free end of the arm 21 will engage the shoulder 25, thus latching the parts in readiness for another operation.

In connection with the improvements above described, I have devised novel means for suspending the scale beam and pan, whereby I am able to dispense with the knife edges commonly employed and thus to get rid of a considerable amount of trouble which the employment of such knife edges has heretofore occasioned. My novel scale beam suspension consists of links 31, 31, each pivoted at its upper end to the framework of the apparatus, as at 32, and provided at its lower end with a cross pin or bar 33 forming a horizontal bearing surface. To each of the end pieces 4—4 of the scale beam is rigidly secured a laterally-extending stud 34 having a cylindrical portion 35 which rests and is adapted to roll upon the cross pin 33, and the free end of said stud is preferably tapered to a point and inserted between the vertical edges of two plates 36, 36, secured to the corresponding support 2, a slight amount of play being permitted between said edges and the tapered end of said stud. As thus constructed, the scale beam is incapable of any lateral movement excepting the minute movements permitted by the play between the edges of the plates 36 and the studs 34. It is, however, free to tilt, in which case the studs 34 roll on the cross pins 33, and inasmuch as said studs are incapable of lateral movement, such rolling action necessarily causes the cross pins 33, together with the lower ends of the links 31, to move laterally under said studs. The result of this construction is that I get the effect of a roller bearing in which the roller has a relatively large radius, said radius being equal to the distance between the pivots 32 and the cross pin 33, since said pivots are the centers around which the turning movement occurs. Thus the effect is the same as it would be if the studs 34 were supported on the rim of a wheel having said radius. In order to prevent accidental disengagement of the studs 34 and the cross pins 33, I prefer to form the lower end of each link 31 in the shape of an inverted U, the ends of which limit the possible lateral movements of said link, and I also prefer to make the cylindrical portion 35 of each stud 34 of less diameter than its outer end, thereby providing shoulders 37 which limit the relative endwise movements of said stud and its link.

For supporting the uprights 8 upon the ends of the scale beam, I have devised a rolling bearing which gives me substantially the same long-radius effect as the bearing above described. In this case I pivot to each upright 8 the upper end of a link 38, as shown at 39, the lower end of which link rests upon a pin 40 secured to the corresponding end piece of the scale beam and passing loosely through a perforation in the upright 8, so that as the pin 40 turns with respect to said upright 8, the lower end of said link rolls along the top surface of said pin, while its upper end turns on the pivot 39 as a center. Lateral displacement of the lower end of said link is prevented by means such as a stud 41 passing through a somewhat larger perforation 42 formed therein and secured to the upright 8. The lateral displacement of said bearing with respect to the end of the scale beam which supports it is prevented by means such as a plate 43 secured to the upright 8 and projecting over the pointed end of the pin 40. It will be understood that this construction is duplicated at each end of the apparatus.

Figure 6:
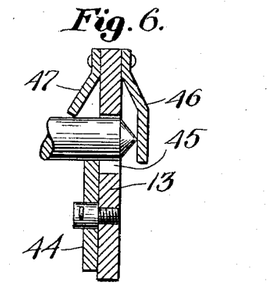
Fig. 6 is a detail vertical section showing my preferred form of bearing for supporting the cut-off.

The scale pan 10 and the cut-off 12 may also be mounted on roller bearings, but as extreme delicacy of movement is not required in these cases, I have shown such bearings as composed of small disks 44 centrally pivoted to the ears 11 and 13, the ends of the axes of said pan and cut-off being passed through openings 45 formed in said ears, and supported on the upper edges of these disks, as shown in Fig. 6. Endwise movement of said axes may be prevented by means of plates 46 similar in structure and function to the plates 43 above described, and I also prefer to locate a small deflecting plate 47 above each end of said axes, which plates extend almost to the tops of the respective axes and serve to prevent loose particles of material from falling on the same and getting into and clogging the bearing surfaces. Similar plates 48, one of which is shown in Fig. 7, serve to prevent loose particles of material from coming in contact with the links 38 and connecting parts.

Figure 2:
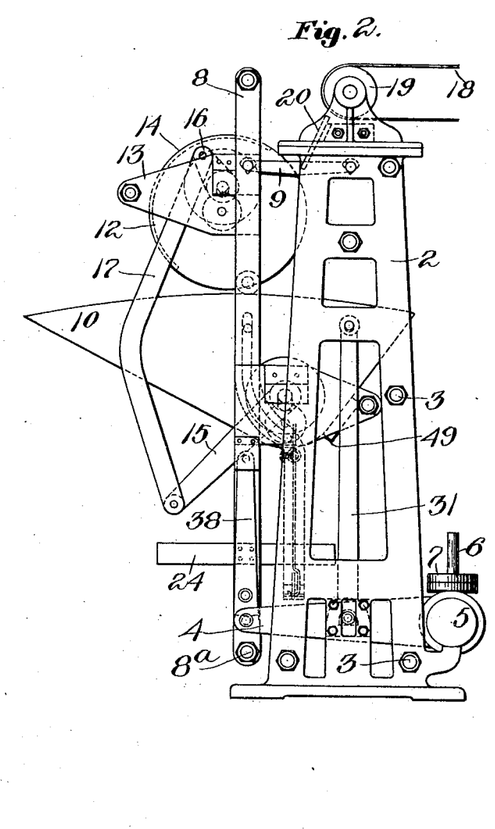
Figs. 2 and 3 are end elevations of the machine as viewed from the right-hand end of Fig. 1, showing the parts in the load-receiving and load-discharging positions respectively.
Figure 3:
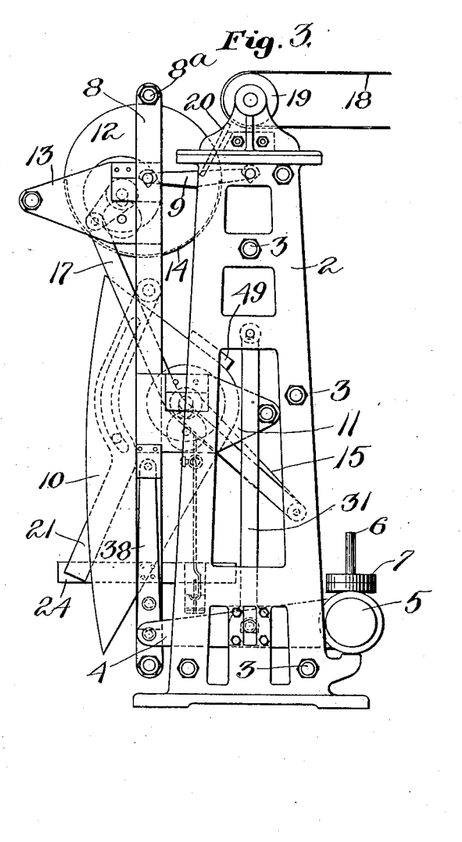

As thus constructed, the operation of my apparatus will be apparent without further description. The material is fed thereto continuously by means of the conveyer belt 18 or otherwise, and when the parts are in the position shown in Fig. 2 said material falls past the cut-off and directly into the scale pan, until a full load has been made up therein. The scale beam thereupon poises and thus causes the plate 27 to operate, whereby the scale pan is released and permitted to discharge its contents. The initial tilting movement of the scale pan actuates the cut-off and brings it into the position shown in Fig. 3, in which position it receives all the material delivered to the apparatus while the scale pan is discharging, and thus accumulates a partial load for the same, and this function is evidently performed regardless of the position of the scale beam, being dependent upon the position of the scale pan only. After said scale pan has discharged its load, it returns to the load-receiving position, this movement being aided by a weight 49 if necessary or desirable, and during the latter part of such movement gives a partial rotation to the cut-off and thus restores it to the position shown in Fig. 2, whereupon the partial load previously accumulated therein is discharged into the scale pan, and the operation is repeated.

It will be observed that in the construction illustrated the axis on which the cut-off turns does not coincide with the axis of the cylindrical portion of said cut-off itself, but is located somewhat to one side of the latter axis. This construction is adopted in order to give the curved bottom of said cut-off a sufficient lateral movement to carry it wholly beyond the path of the falling stream of material, when the parts are in the position shown in Fig. 2, without making it necessary to employ a cut-off of excessive and otherwise unnecessary diameter. It will be seen upon reference to Fig. 3 that by this means I obtain the same result as would be obtained by a cylindrical cut-off having its radius equal to the distance between the axis on which my cut-off turns and the inner edge of its curved bottom portion 14. It is also to be noted that the stream-controller is operated to cut off the flow of material to the receptacle 10 by the dumping of said receptacle, as distinguished from the descent thereof. This arrangement provides, without the use of springs and trip-devices therefor, a greater and more quickly acting force for this operation than can be obtained from the descent of a filled receptacle, because the latter is practically counterbalanced and hence moves slowly and with little force.

Although I have herein described my improvements as embodied in a machine especially intended to weigh light, bulky materials, yet it will be evident that said improvements are not limited to such use but are serviceable for weighing a great variety of materials.

So far as I am aware, I am the first to provide an automatic weighing apparatus adapted to receive a continuous stream of material and having an accumulating cut-off for said stream which is mounted upon and moves with the scale beam and is operated by positive connections with the load receiver, and hence I consider that the specific construction and arrangement herein shown may be widely varied without departing from this portion of my invention.

I claim as my invention:

1. In an automatic weighing machine, the combination with a scale beam and a load receiver carried thereby, and means for supplying material thereto continuously, of a stream-controller forming also an accumulating receptacle, said stream-controller being supported by and movable with the scale beam, and means for actuating said stream-controller.

2. In an automatic weighing machine, the combination with a scale beam and a load receiver carried thereby, and means for supplying material thereto continuously, of a stream-controller forming also an accumulating receptacle, said stream-controller being supported by and movable with the scale beam, and connections between said load receiver and stream-controller for actuating the latter.

3. In an automatic weighing machine, the combination with a scale beam and a load receiver carried thereby, and means for supplying material thereto continuously, of a stream-controller forming also an accumulating receptacle, said stream-controller being supported by and movable with the scale beam, connections between said load receiver and steam-controller for actuating the latter, and a latch controlling the discharge of said load receiver.

4. In an automatic weighing machine, the combination with a scale beam and a load receiver carried thereby, and means for supplying material thereto continuously, of a stream-controller forming also an accumulating receptacle, said stream-controller being supported by and movable with said scale beam, and means for shifting said stream-controller from its discharging to its accumulating position upon the discharge of said load receiver, and for dumping its accumulated contents into the load receiver upon the restoration of the latter to its normal position.

5. In an automatic weighing machine, the combination of a scale beam, a scale pan carried thereby, a cut-off also carried by said beam, connections between said scale pan and cut-off whereby the tilting movement of the former operates the latter, a latch controlling the dumping of said scale pan, and means for releasing said latch upon the poising of the scale beam.

6. In an automatic weighing machine, the combination of a scale beam, a dumping scale pan carried thereby, an accumulating cut-off also carried by said beam, means for supplying material thereto continuously, connections between said scale pan and cut-off for operating the latter, and means controlling the dumping of the scale pan.

7. In an automatic weighing machine, the combination of a scale beam, a frame supported thereby, a scale pan journaled in said frame, a cut-off journaled in said frame above the scale pan, and connections between said scale pan and cut-off comprising arms 15 and 16 and a connecting link 17.

8. In an automatic weighing machine, the combination of a scale beam, a frame supported thereon, a scale pan journaled in said frame on an axis located below and to one side of the center of gravity of said pan and a contained load, a cut-off supported by said frame above the scale pan, connections between said scale pan and cut-off for operating the latter, and a latch controlling the dumping of said scale pan.

9. In an automatic weighing machine, the combination with a scale beam and a load receiver carried thereby, of a stream-controller also carried by and movable with said scale beam, and composed of an eccentrically mounted cylinder having a portion of its periphery cut away, and connections between said load receiver and stream-controller whereby the latter is actuated by the dumping of the former.

10. In an automatic weighing machine, the combination with a scale beam and a load receiver carried thereby, of means controlling the discharge of said load receiver, comprising a latch arm 21, connections between the same and the load receiver, a stop shoulder 25, fixed relatively to the load receiver, and means for releasing said arm from said stop shoulder upon the descent of the load receiver.

11. In an automatic weighing machine, the combination with a scale beam and a load receiver carried thereby, of means controlling the discharge of said load receiver, comprising a latch arm 21, connections between the same and the load receiver, a stop shoulder 25, a pivoted plate 27 movable with said arm and normally bearing against the same, and a fixed connection between said plate and the frame of the machine.

12. In an automatic weighing machine, the combination of a scale beam, a frame carried thereby, a scale pan journaled in said frame and arranged to be tilted by its weight and that of a contained load, a stream-controller carried by said frame above said scale pan, connections between the scale pan and stream-controller whereby the dumping movement of the former operates the latter, and a latch controlling the dumping of the scale pan and comprising a latch arm 21 pivoted to said frame and provided with a cam slot, a pin carried by the scale pan and journaled in said slot, a stop shoulder for said arm, and means for releasing said arm from said stop shoulder upon the descent of the scale beam.

13. In an automatic weighing machine, the combination of a scale beam, a load receiver carried thereby, means for controlling the delivery of material to said load receiver, and means for supporting said scale beam comprising pivotally-suspended links provided with horizontal bearing surfaces, cylindrical bearing studs carried by the scale beam and supported on said bearing surfaces, and means for preventing lateral movement of said studs.

14. In an automatic weighing machine, the combination of a scale beam, a load receiver carried thereby, means for controlling the delivery of material to said load receiver, and means for suspending said scale beam comprising pivotally-suspended links each having its lower end shaped like an inverted U and provided with a cross-pin, cylindrical bearing studs carried by the scale beam and supported on said cross-pins respectively, and means for preventing lateral movement of said studs.

15. In an automatic weighing machine, the combination of a scale beam, a load receiver carried thereby, means for controlling the delivery of material to said load receiver, and means for suspending said scale beam comprising links 31 pivotally suspended at their upper ends and having their lower ends each shaped like an inverted U and provided with a cross-pin, fixed studs secured to the scale beam and having pointed free ends, and also having cylindrical bearing surfaces of reduced diameter to rest upon said cross-pins, and plates 36 having adjacent edges between which the ends of said studs are located.

16. In an automatic weighing machine, the combination with a scale beam, of a frame supported thereon and carrying weighing mechanism, links connecting said frame with the frame work of the machine, and means for supporting said frame on said scale beam comprising arms 38 pivoted to said frame, means for limiting the pivotal movements of said arms, and studs 40 carried by the scale beam and supporting the lower ends of said arms 38 respectively, substantially as described.

17. In an automatic weighing machine, the combination of a scale beam and roller disks carried thereby, a tilting receptacle provided with horizontally-extending pins supported on the upper edges of said disks, means for preventing lateral movement of said pins, and means for controlling the delivery of material to said receptacle.

18. In an automatic weighing machine, the combination of a scale beam, a supporting frame carried thereby and provided with vertically-extending slots, a roller disk carried by said frame below each of said slots and extending above the bottom thereof, a tilting receptacle provided with horizontally-extending pins supported on said roller disks and entering said slots respectively, and means for controlling the delivery of material to said receptacle.

19. In an automatic weighing machine, the combination of a scale beam, a supporting frame carried thereby and provided with slots 45 and with roller disks 44 located below said slots respectively, a tilting receptacle provided with horizontally-extending pins supported on said disks and passing through said slots, plates 46 for preventing endwise movement of said pins, and means for controlling the delivery of material to said receptacle.

In testimony whereof, I have hereunto subscribed my name this fourteenth day of February, 1903.

WILLIAM E. NICKERSON.

Witnesses:
E. D. CHADWICK,
JOSEPH T. BRENNAN.